United States Patent [19]
Allen

[11] Patent Number: 5,820,002
[45] Date of Patent: Oct. 13, 1998

[54] LOCKABLE BICYCLE RACK

[75] Inventor: Scott R. Allen, McKinleyville, Calif.

[73] Assignee: Yakima Products, Inc., Arcata, Calif.

[21] Appl. No.: 621,749

[22] Filed: Mar. 22, 1996

[51] Int. Cl.⁶ .............................. B60R 9/00; B60R 9/048
[52] U.S. Cl. ...................... 224/324; 224/310; 224/323; 224/502; 224/924; 211/70
[58] Field of Search .................... 224/323, 324, 224/310, 502, 924; 211/5, 70

[56] References Cited

U.S. PATENT DOCUMENTS

| | | |
|---|---|---|
| 2,415,286 | 2/1947 | Hyde . |
| 2,431,400 | 11/1947 | Iverson . |
| 4,126,228 | 11/1978 | Bala et al. .................................. 211/5 |
| 4,442,961 | 4/1984 | Bott . |
| 4,629,104 | 12/1986 | Jacquet . |
| 4,700,873 | 10/1987 | Young . |
| 4,702,401 | 10/1987 | Graber et al. . |
| 4,875,608 | 10/1989 | Graber . |
| 5,025,932 | 6/1991 | Jay . |
| 5,042,705 | 8/1991 | Johansson ............................... 224/315 |
| 5,052,605 | 10/1991 | Johansson ............................... 224/324 |
| 5,169,044 | 12/1992 | Englander . |
| 5,230,449 | 7/1993 | Collins et al. . |
| 5,244,101 | 9/1993 | Palmer et al. . |
| 5,445,300 | 8/1995 | Eipper et al. ........................... 224/924 |

*Primary Examiner*—David J. Walczak
*Assistant Examiner*—Timothy L. Maust
*Attorney, Agent, or Firm*—Kolisch, Hartwell, Dickinson, McCormack & Heuser

[57] ABSTRACT

A vehicle-mounted, bicycle carrier includes an elongate arm movably mounted on the carrier for movement between an engaged position in which a bicycle is fixed on the carrier, and a disengaged position in which the bicycle may be removed from the carrier. A locking mechanism mounted on the arm lockably receives a carried bicycle's pedal crank when the arm is moved to the engaged position thereby fixing the bicycle on the carrier.

5 Claims, 3 Drawing Sheets

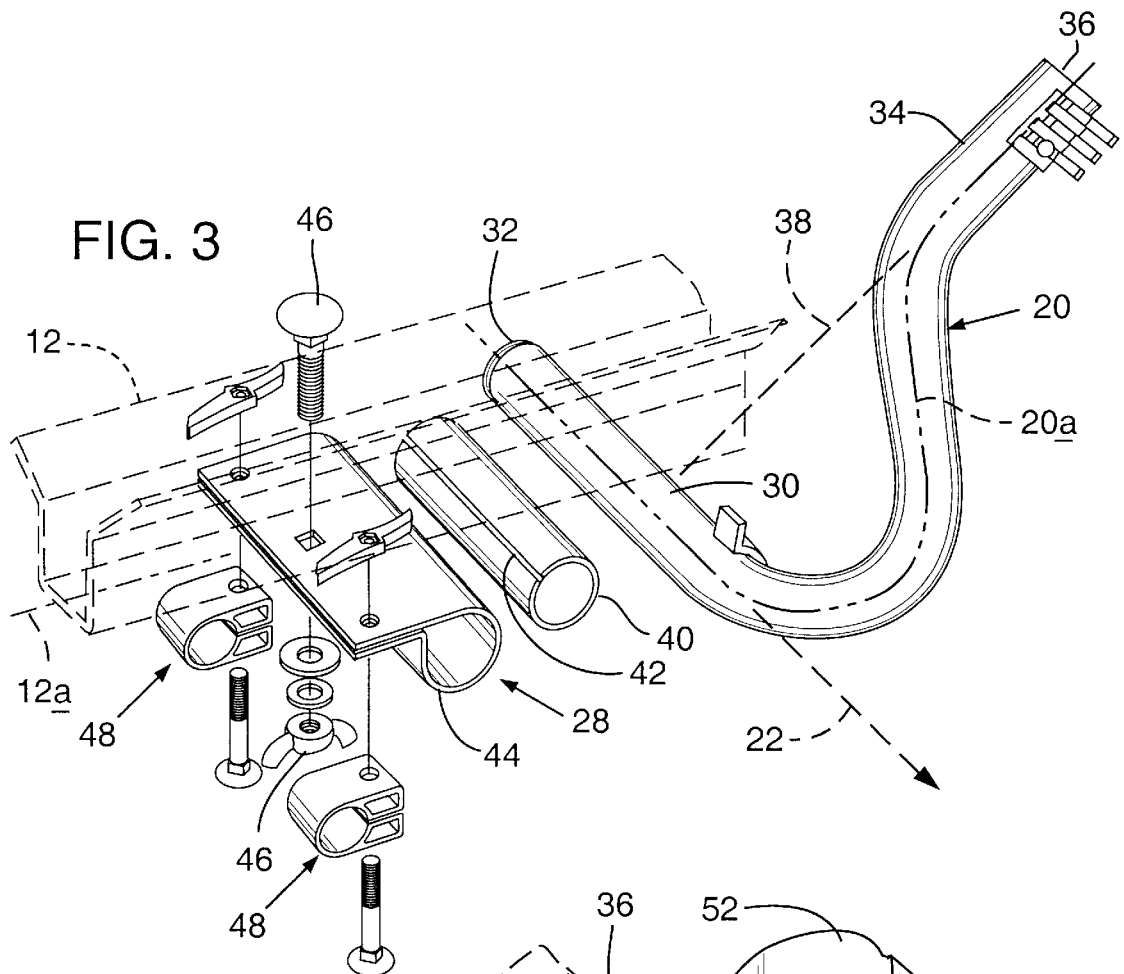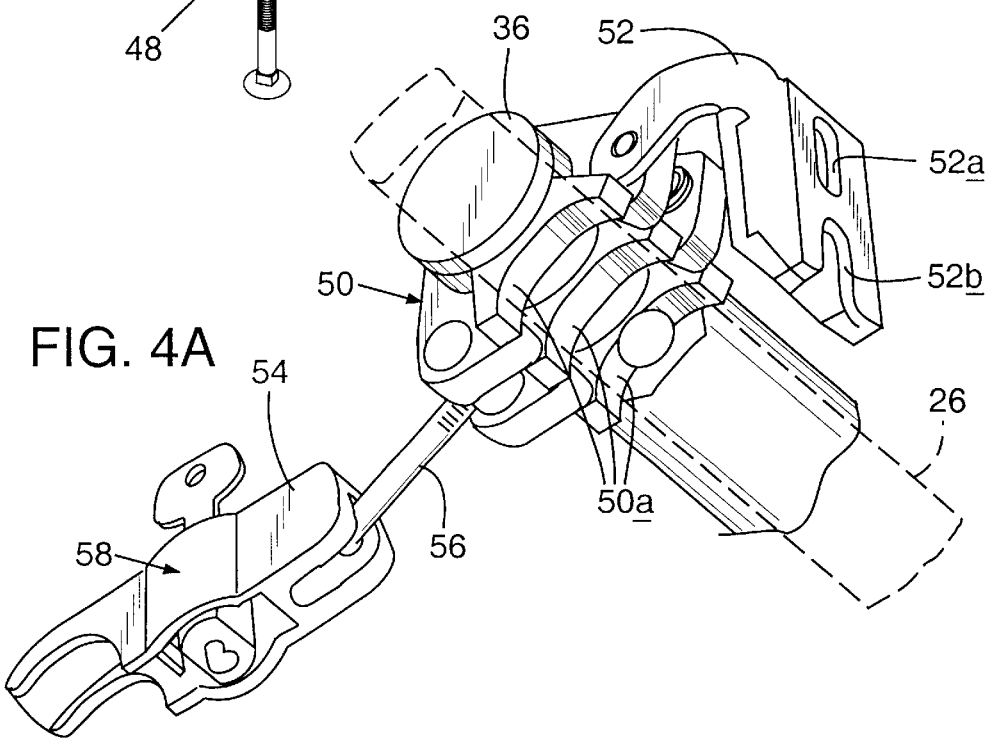

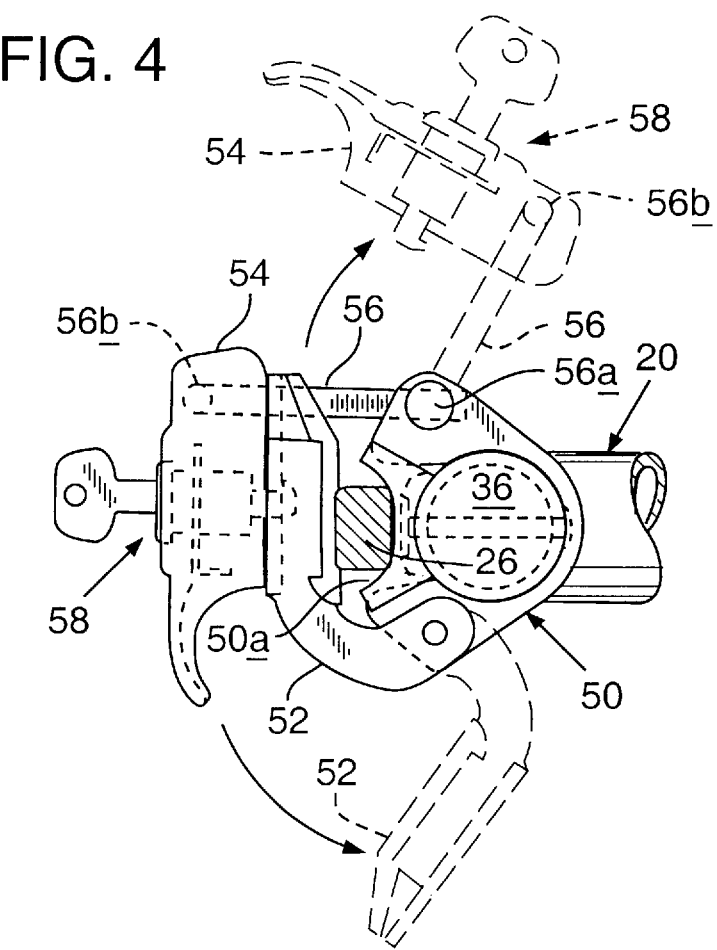

LOCKABLE BICYCLE RACK

BACKGROUND AND SUMMARY OF THE INVENTION

This invention relates generally to bicycle-carrying racks, and more particularly it concerns a lockable bicycle carrying rack adapted for use with a vehicle.

Vehicle-mounted bicycle-carrying racks are known. Such racks are useful for carrying bicycles from one location to another. Roof-mounted bicycle racks are one type of bicycle rack which enables a person to carry one or more bicycles atop a vehicle. Such racks usually include a tray for receiving one or more of a bicycles tires and a mechanism for locking the bicycle into place. Prior art locking mechanisms include such things as fork mounts (which require the removal of the front tire and lock the individual tines of the fork into place), and other types of locking devices which lock onto various parts of a carried bicycle.

One problem associated with fork-mount-type locking mechanisms is that the front tire of the bicycle (or bicycles) must be removed each and every time one desires to transport a bicycle (or bicycles) to a different location. Not only is the removal (prior to placing a bicycle in a rack) and replacement (after arriving at a desired location) time consuming, it is cumbersome as well because the bicycle must be inverted and placed on the ground in an inverted standing position to remount the tire. Additionally, those who have had to do this more than once will appreciate that remounting a front bicycle tire is not always as simple as replacing the tire and tightening down a skewer. Often times, minute adjustments to the brakes must be made to compensate for any deviation from the tire's original position. All of this translates into time which a rider must spend away from riding.

Some proposed solutions to the above problem include locking mechanisms or devices which lock onto other parts of a bicycle. While a number of such devices are known, the known devices are limited in utility because, among other reasons, they either: (1) require the precise placement of a bicycle in a rack; (2) are not readily lockable for protecting against theft; (3) do not easily accommodate different-sized bicycles; and/or (4) are bulky or cumbersome to use.

One such attempt is described in U.S. Pat. No. 4,442,961 to Bott which describes a bicycle carrier for carrying a bicycle above a vehicle surface such as a roof. The carrier includes a brace member which is connectable onto the bicycle's frame to secure the bicycle against lateral movement relative to the surface. One problem with Bott's carrier is that the brace member is dimensioned so that it secures a bicycle to the carrier by connecting onto the bicycle's frame, above the midpoint of the bar which extends between the bicycle's seat and pedal hub. This makes it difficult, if not impossible for one person to load a bicycle thereon because one would have to climb up onto the vehicle in order to reach the locking mechanism and lock the bicycle in place. Another problem associated with Bott's brace member is that it takes up more than half of the available surface area on a vehicle upon which one or more bicycles may be carried. At best, Bott's bicycle carrier could carry only two bicycles.

Another such example is U.S. Pat. No. 5,025,932 to Jay which discloses a bicycle rack which includes a pair of posts which are provided with slots for vertically receiving crank arms of a bicycle. In order to mount a bicycle on the rack disclosed in Jay, one must first orient the bicycle's crank arm to be substantially vertical, lift the bicycle into the air, and precisely position the crank arm by lowering the bicycle so that the crank arm is inserted into the slot in the post. If the bicycle is moved or for some reason not precisely aligned with the slot in the post, mounting the bicycle therein will be difficult if not impossible.

Another rack which is both cumbersome to use, and not readily adaptable for different sized bicycles is disclosed in U.S. Pat. No. 2,431,400 to Iverson, which shows a bicycle rack adapted for mounting on the rear of a vehicle. Plural mounting brackets are provided and are manually positionable on a bumper for attaching, one each, to a bicycle tire. An intermediate fastener is provided between, and independent from the mounting brackets, and includes a vertically-extending post having a screw-threadedly advanceable jaw for securing around the crank arm of a bicycle (which crank arm must be oriented substantially horizontal in order for the bicycle to be secured in the rack). Iverson's rack would not conveniently allow a person to carry a bicycle which is dimensioned larger or smaller than the bicycle carried directly before because each of the mounting brackets would have to be relocated (or at least one would have to be), and the jaw would have to be relocated to accommodate taller and shorter bicycles.

Needless to say, the prior proposed solutions for carrying bicycles fall short of providing an easy-to-use, compact, time-saving, easily-adaptable bicycle carrier for carrying bicycles of all shapes and sizes without the need to adjust the rack or the bicycle.

With the above problems in mind, it is a general object of the invention to provide a bicycle-carrying rack which easily carries bicycles of all shapes and sizes, and which does so in a time-saving manner.

It is another object of the present invention to provide a bicycle-carrying rack which includes a locking mechanism or device which does not require the bicycle to be dismantled in any way, in order for the bicycle to be locked into place.

It is yet a further object of the invention to provide a bicycle-carrying rack with a locking mechanism which may be applied to a bicycle (regardless of the shape or size thereof) in a quick and efficient manner, and which securely locks the bicycle in place for carrying.

In brief summary, the invention achieves these and other objects in the form of a vehicle-mounted, bicycle carrier which includes an elongate arm movably mounted on the carrier for movement between an engaged position in which a bicycle is fixed on the carrier, and a disengaged position in which the bicycle may be removed from the carrier. A locking mechanism is mounted on the arm for lockably receiving a carried bicycle's pedal crank when the arm is moved to the engaged position thereby fixing the bicycle on the carrier.

These and additional objects and advantages of the present invention will be more readily understood after a consideration of the drawings and the detailed description of the preferred embodiment.

BRIEF DESCRIPTION OF THE DRAWINGS

FIG. 3 is an isometric exploded view of a portion of the rack, showing the arm and structure useful for mounting the arm on a vehicle-carried tray.

FIG. 4 is a view along line 4—4 in FIG. 1 which shows a locking mechanism constructed according to the preferred embodiment of the present invention.

FIG. 4A is an isometric view of the locking mechanism of FIG. 4, only showing more detail.

DETAILED DESCRIPTION OF THE PREFERRED EMBODIMENT

Figure 1:
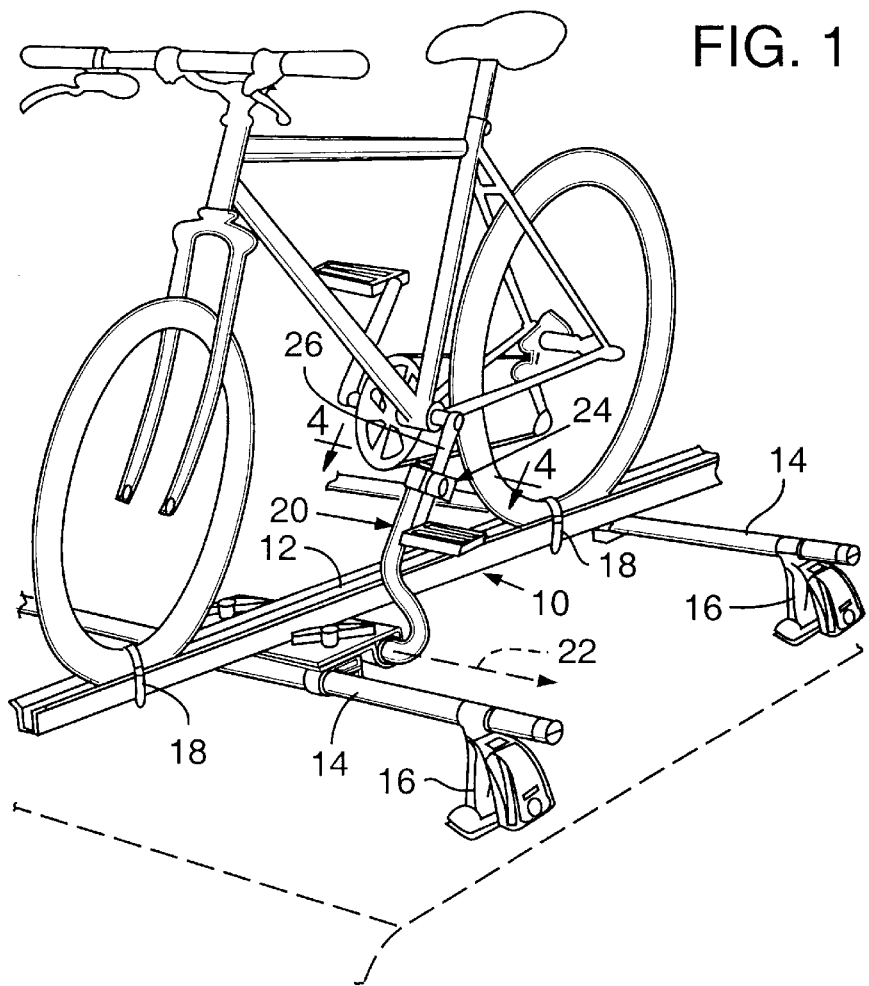
FIG. 1 is an isometric view of a bicycle rack constructed according to the preferred embodiment of the present invention, shown atop a vehicle roof and carrying a bicycle thereon.

As shown in FIG. 1, a bicycle-carrying rack according to the preferred embodiment is shown generally at 10.

Figure 2:
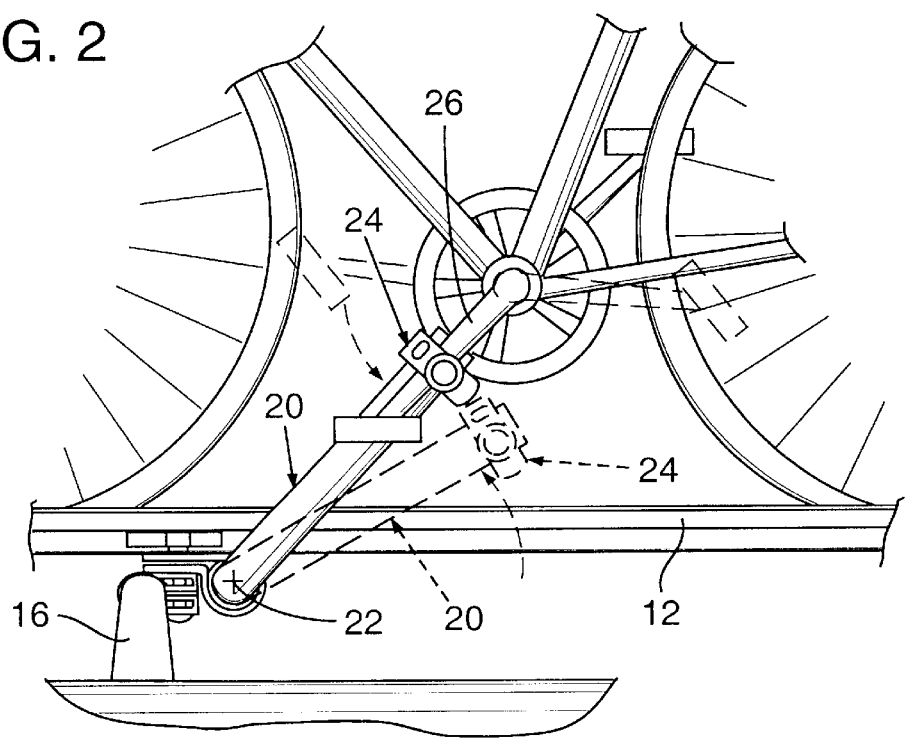
FIG. 2 is a side plan view of a portion of the rack of FIG. 1, showing the rack's arm in so-called engaged and disengaged positions.

FIGS. 1 and 2 show that rack 10 is the type of rack which includes an elongate tray 12 mounted or fixed to two cross bars 14 which are elevated a short distance above a vehicle's roof by a pair of stanchions 16. Tray 12 accommodates placement of a bicycle by receiving the bicycle's tires which may thereafter be secured by any suitable ties, such as those shown at 18.

Rack 10 includes an elongate, tubular arm, shown generally at 20, which is operatively connected to tray 12 for movement, preferably pivotable movement about a pivot axis 22 between a first or engaged position which is shown in FIG. 1 and in solid lines in FIG. 2, and a second or disengaged position shown in phantom in FIG. 2. As is most evident from FIG. 2, the first and second positions are different from one another, the former being one in which a bicycle is capable of being locked or fixed in place on the rack, and the latter being one in which the bicycle is not locked in place and may be removed from the rack. To that end, a lock or lock member is provided and is generally indicated at 24. Member 24 is positioned on arm 20 for receiving and locking onto a bicycle's pedal crank 26 and fixing the bicycle on the rack when the arm is moved to the first position mentioned above. The lock, described in more detail below, may be unlocked so that the arm may be moved to the second position for allowing the bicycle to be removed from the rack.

FIG. 3 shows an isometric exploded view of a portion of rack 10, and most notably arm 20 and the mounting structure utilized to mount the arm on the rack. A portion of tray 12 may be seen in phantom lines and the tray's long axis is indicated by the dashed-dot line 12a. Arm 20 is of a defined length, preferably around between 25- to 35-inches, although any suitable length will suffice. The arm originates, preferably, at a position which is between the vehicle's roof and the lowest point of a bicycle which has been placed in the tray, i.e. the bicycle's tire. To that end, mounting structure, indicated generally at 28, is provided for mounting arm 20 to the underside of the tray.

Describing first the preferred arm structure, arm 20 has a central axis indicated by the dashed-double-dot line 20a. The central axis might be described as arcuate to some extent because of the curved region appearing generally in the middle portion of the arm. The arcuate nature of the arm allows the arm to be moved or pivoted into a locking or engaged position so that a bicycle's pedal crank may be locked onto by lock member 24 and the bicycle secured in the rack. Arm 20 preferably extends along a straight first section 30 from its point of origin 32 beneath the bicycle and tray, to a point where it bends or curves around somewhat, back upon itself. From there, the arm extends along a generally straight second section 34 and toward a terminal end 36. First section 30, when mounted in place via the to-be-described mounting structure, defines the arm's pivot axis 22. More specifically, FIG. 3 shows the arm's central axis 20a which follows the arcuate contour of the arm described above. The reader will notice that the central axis which runs through the arm's first section 30 has been extended to illustrate and define a straight line which corresponds to pivot axis 22. This line represents the arm's pivot axis when the arm is mounted on the rack via the mounting structure described below. When so mounted, according to the preferred embodiment, axis 22 lies beneath tray 12 and is preferably transverse the tray's long axis 12a. Further, the reader will notice that the portion of the arm's central axis which runs through the arm's second section 34 has been extended in a like manner to define a line 38. According to the preferred embodiment, the arm's bend is such that the arm's first and second sections 30, 34 respectively, lie in the same plane. Further, the bend preferably orients the arm's first and second sections so that the extended lines 22, 38 are generally orthogonal to one another. In addition, it is preferable that lines 22, 38 intersect or come close to intersecting at a point which lies on the concave side of the bend so that second section 34 is capable of being conveniently positioned closely adjacent the pedal crank 26, and preferably on the inside of the pedal crank. This is preferable so that the lock or lock member 24 does not interfere with the bicycle's pedal or vice versa. It will be appreciated, however, that other constructions may be utilized and that the above-described preferred embodiment is not intended to limit the invention in any way. For example, it is possible that the arm could curve upwardly from its point of origin so that the lock member could lock onto the outside of the pedal crank. It is also possible for the arm to be bent in a manner such that the entire arm does not lie in the same plane, as might be the case, if, for instance, the lock member were to lock onto the pedal crank from a position directly in front of, or behind the pedal crank. In this case, the arm's bend might be oriented in a plane which is generally or substantially parallel to the tray 12, as viewed in FIG. 3. Needless to say, there are simply numerous configurations an arm may have, all of which are considered within the spirit and scope of the invention.

The preferred mounting structure, indicated generally at 28 in FIG. 3 will now be described. Preliminarily, the reader will notice that the mounting structure is configured for mounting on the underside of tray 12. This is because the tray is most often carried a short distance above a vehicle's roof by the above-mentioned bars 14 and stanchions 16. Accordingly, there exists such a space, upon which the present preferred embodiment has capitalized by recognizing that the mounting structure may be conveniently located therewithin. It will be understood that the mounting structure could be located any convenient place on or around the tray, bars, stanchion etc. For example, if a tray were mounted on a vehicle in a manner such that the above-mentioned spaced were too small to accommodate placement of the mounting structure, then the mounting structure could simply be mounted on top of the tray. Such might be the case if the tray were mounted in the bed of a truck for carrying a bicycle.

With that, the preferred mounting structure will be described by reference to FIG. 3. which shows an elongate tubular sleeve 40 with a longitudinally disposed slit 42, a receiver 44 for accommodating the insertion of sleeve 40, and plural fastening mechanisms for fastening receiver 44 to tray 12 (mechanism 46) and sleeve 40 interiorly of receiver 44 (mechanisms 48 on either side of tray 12). With respect to fastening sleeve 40 within the receiver, it will be appreciated that once sleeve 40 is inserted into receiver 44, the first section 30 of arm 20 may, in turn, be inserted into the sleeve. By tightening down fastening mechanisms 48, the sleeve's slit is pinched tight and the arm's first section is squeezed snugly so that the arm may not be removed. Loosening up fastening mechanisms 48 allows the arm to be moved about its pivot axis 22 for the purpose of bringing the second section 34 into proximity with a bicycle's pedal crank so that the locking member may lock onto the crank in a manner described below.

With respect to the preferred locking mechanism, the reader's attention is directed to FIGS. 4 and 4A. FIG. 4 is a view along line 4—4 in FIG. 1 and shows the locking member in both solid and phantom lines. The solid lines show the member in the locked or engaged position where the bicycle's pedal crank is indicated at 26. The phantom lines show the lock member in the disengaged position in which the bicycle's pedal crank may be removed from the member and the bicycle removed from the rack. FIG. 4A is an isometric view of the lock member which shows a bit more detail.

The lock member is mounted adjacent the terminal end 36 of arm 20 and includes three main elements. A first element 50 is fixed or connected adjacent the terminal end 36 of the arm and includes, as shown in FIG. 4A, three curved capture members 50a against which pedal crank 26 is captured when the lock member is closed as described below. A second element 52 is pivotally connected to the first element in a manner which permits it to be pivoted out of the way (shown in phantom lines in FIG. 4) so that the pedal crank 26 may be inserted or removed from the lock member. A third element 54 is pivotally connected to first element 50 by virtue of a rod 56 which defines two pivot points 56a, 56b (FIG. 4). Pivot point 56a permits third element 54 to be pivoted relative to first element 50, and pivot point 56b permits third element 54 to be pivoted relative to rod 56. The third element carries a key-operated lock 58 which locks the lock member around pedal crank 26. More specifically, when pedal crank 26 is moved into the position shown in FIG. 4A, second element 52 may be pivoted so that it engages the pedal crank (FIG. 4). Thereafter, third element 54 may be pivoted from the position shown in FIG. 4A, to the position shown in FIG. 4 so that the lock member may be firmly locked around the pedal crank. FIG. 4A shows a slot 52a and a groove 52b in the second element 52. Slot 52a accommodates a lockable snib on third element 54, and groove 52b accommodates rod 56 when the lock member is locked around pedal crank 26. Before, however, locking the pedal crank into position, a bicycle must first be loaded onto the rack. This operation is described directly below.

OPERATION

Rack 10 is simple to use by virtue of a construction which lends itself readily to carrying bicycles of all shapes and sizes. The preferred rack saves time because a bicycle need not be dismantled in any way in order for it to be carried on the rack. Furthermore, the preferred rack incorporates a locking member or mechanism which may be quickly applied to a bicycle for locking it onto the rack.

To use the invented rack, one must first load a bicycle onto the rack, as is shown in FIG. 1, so that the bicycle's tires are seated in tray 12. The tires may thereafter be fastened onto the tray via any suitable means such as the ties shown at 18. FIG. 2 shows the bicycle in place on the rack from a perspective taken along the arm's pivot axis 22 which is into the page as viewed in FIG. 2, wherein the arm 20 may be pivoted in a counterclockwise direction from the disengaged position which is indicated in phantom lines, to an engaged position shown in solid lines. Likewise, the bicycle's pedal crank may be moved in the counterclockwise direction so that it is brought into line with the arm. This positioning permits the lock member to be brought into close proximity with the pedal crank so that the lock member may be fastened around the pedal crank as described above.

Briefly summarizing, a vehicle-mounted, bicycle carrier has been described. The carrier includes an elongate arm movably mounted on the carrier for movement between an engaged position in which a bicycle is fixed on the carrier, and a disengaged position in which the bicycle may be removed from the carrier. A locking mechanism is mounted on the arm for lockably receiving a carried bicycle's pedal crank when the arm is moved to the engaged position thereby fixing the bicycle on the carrier.

While the present invention has been shown and described with reference to the foregoing preferred embodiment, it is to be understood by those skilled in the art that other changes in form and detail may be made therein without departing from the spirit and scope of the invention as defined in the appended claims.

It is claimed and desired to secure by Letters Patent:

1. A bicycle-carrying rack for carrying a bicycle on a vehicle comprising:

an elongate tray mountable on a vehicle's roof a short distance thereabove, and configured for receiving at least one of a bicycle's tires;

an elongate arm pivotably mounted on the tray, the arm being of a defined length which originates at a position between the vehicle's roof and the lowest point of a bicycle which has been placed in the tray, the arm extending straight along its length from its point of origin to a point where it bends, somewhat, back upon itself extending thereafter to a terminal end which is movable to a position closely adjacent a bicycle's pedal crank; and a lock member mounted on the arm adjacent the arm's straight terminal end for locking onto one of the bicycle's pedal cranks when the arm's terminal end is positioned adjacent the bicycle's pedal crank.

2. The rack of claim 1, wherein the arm's bend permits the arm's terminal to be positioned inside of the bicycle's pedal crank.

3. The rack of claim 1, wherein the arm is pivotable about an axis which lies below the tray.

4. The rack of claim 3, wherein the pivot axis is generally transverse the tray's long axis.

5. The rack of claim 1, wherein the arm includes a generally straight section between the arm's bend and terminal end, and wherein when the terminal end is positioned closely adjacent the bicycle's pedal crank, the straight section generally lines up with the pedal crank when viewed from a point on the arm's pivot axis.

* * * * *